Patented June 29, 1937

2,085,315

UNITED STATES PATENT OFFICE 2,085,315

ORTHO-AMINOAZO COMPOUND

Erwin Hoffa and Hans Heyna, Frankfort-on-the-Main, Germany, assignors to General Aniline Works, Inc., New York, N. Y., a corporation of Delaware No Drawing. Application January 27, 1934, Serial No. 708,690. In Germany February 1, 1933

4 Claims. (Cl. 260—96)

The present invention relates to ortho-aminoazo compounds, more particularly it relates to new compounds of the general formula:

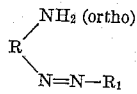

wherein R stands for a radical of the benzene series and $R_1$ represents a radical of the benzene series which contains a negative substituent, such as halogen or the nitro group, in ortho-position to the azo group.

Our new compounds which are suitable for use as dyestuffs or as intermediates for the production of dyestuffs are obtainable by treating an ortho-nitroazo compound of the general formula:

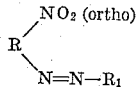

wherein R and $R_1$ have the above meaning, with a reducing agent, for instance with an alkali metal sulfide.

The attempts hitherto made to reduce ortho-nitroazo compounds to ortho-aminoazo compounds have not been successful. Thus, the experiments of Bamberger and Hübner ("Berichte der Deutschen Chemischen Gesellschaft", Vol. 36, page 3822) carried out with compounds of the general formula

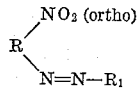

(R and $R_1$ standing for unsubstituted or substituted benzene radicals), did not lead to ortho-aminoazo compounds but to compounds of the type:

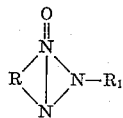

We have now found that those ortho-nitroazo compounds of the above general formula in which R stands for a radical of the benzene series and $R_1$ represents a radical of the benzene series which contains a negative substituent, such as halogen or the nitro group, in ortho-position to the azo group and which may contain further substituents in the radicals R and $R_1$, are converted into the corresponding ortho-aminoazo compounds by treatment with reducing agents.

Another method of producing the said compounds consists in combining a diazonium compound of the benzene series containing a negative substituent in ortho-position to the diazonium group with an amino compound of the benzene series capable of coupling with a diazo compound in ortho-position to the amino group. Suitable amino compounds are those amino compounds of the benzene series which are substituted in the para-position to the amino group. The formation of ortho-aminoazo compounds takes place particularly smoothly with para-substituted amino compounds of the benzene series which contain beside the substituent in the para-position to the amino group a substituent which is capable of promoting coupling, such as the alkoxy group. The coupling may be carried out in dilute or concentrated acids or in organic solvents.

In those cases, where the corresponding ortho-nitroazo compounds are easily accessible, the reduction method may be used; in other cases the coupling method may be applied. The latter method is advantageously used if it is intended to produce ortho-aminoazo compounds containing nitro groups in other positions than in the ortho-position to the azo group, such as 5-methyl-4-methoxy-2-amino-2'-chloro-4'-nitroazobenzene. In such cases the reduction of the corresponding ortho-nitroazo compound would probably also cause a reduction of the nitro group in the 4'-position. It may, however, still be practical to apply the reduction method even to ortho-nitroazo compounds which contain further reducible groups, particularly if it is desired to produce ortho-aminoazo compounds possessing a further amino group in a position other than in the ortho-position to the azo group.

The following examples serve to illustrate the invention, but they are not intended to limit it thereto. The parts are by weight, unless stated otherwise:

(1) 190 parts of 2'-chloro-2-nitroazobenzene are dissolved in 6000 parts by volume of alcohol. A solution of 520 parts of crystallized sodium sulfide in 520 parts of water is caused to run into the aforesaid boiling solution in the course of one hour. Dilute hydrochloric acid is added to the solution obtained, until the color of the latter turns red-orange. Thereupon 10,000 parts of water are added thereto. The precipitate is filtered by suction; 2'-chloro-2-aminoazobenzene, melting at 105° C., is obtained in a pure state by recrystallization from alcohol. A similar compound is obtained by using the corresponding 2'-bromo-2-nitroazobenzene.

(2) 240 parts of 2',4'-dichloro-2-nitroazobenzene are boiled under reflux with 8000 parts by volume of alcohol. In the course of one hour a solution of 576 parts of crystallized sodium sulfide in 580 parts of water is run in. Dilute hydrochloric acid is added to the reaction product until a change in color is obtained and then 10000 parts of water are added. The solution is filtered and 2',4'-dichloro-2-aminoazobenzene, melting at 115° C., is obtained in a pure state by recrystallization from alcohol.

The reduction of the corresponding 2',4'-dibromo-2-nitroazobenzene yields 2',4'-dibromo-2-aminoazobenzene.

(3) 31 parts of 4-methyl-2-nitro-2',4'dichloroazobenzene, melting at 154° C. to 155° C., are dissolved in 1250 parts of alcohol and, at boiling temperature, a solution of 72 parts of sodium sulfide in 70 parts of water is slowly added thereto in the course of one hour. When the reduction is finished, the whole is filtered by suction and the residue, remaining on the filter, is washed out with water. 4-methyl-2-amino-2',4'-dichloroazobenzene, recrystallized from alcohol, melts at 166° C. to 167° C.

(4) 54 parts of 2,2'-dinitroazobenzene are boiled under reflux in 2000 parts by volume of alcohol. A solution of 72 parts of crystallized sodium sulfide in 70 parts of water is caused to run in in the course of one hour. The greatest part of alcohol is distilled off from the filtered solution and the residue is diluted by means of water. The precipitate obtained which is at first greasy, solidifies gradually. By recrystallization from ligroin, 2'-nitro-2-aminoazobenzene is obtained in the form of yellow crystals, melting at 145° C. to 147° C.

(5) By reduction of the corresponding ortho-nitroazo-compounds, there are obtainable, for instance, 4-methoxy-2-amino-2'-chloroazobenzene, melting at 164° C., 4-methoxy-2-amino-2'-chloro-4'-methoxyazobenzene, melting at 132° C., 5-methyl-4-methoxy-2-amino-2',4'-dichloroazobenzene, melting at 196° C. to 197° C., 5-methyl-4-methoxy-2-amino-2',5'-dichloroazobenzene, melting at 147° C., 5-methyl-4-methoxy-2-amino-2'-nitro-4'-chloroazobenzene, melting at 198° C., 5-methyl-4-methoxy-2-amino-2'-nitro-4'-methoxyazobenzene, melting at 181° C., 5-methyl-4-methoxy-2-amino-2'-nitro-4'-methylazobenzene, melting at 171° C., 5-methyl-4-ethoxy-2-amino-2',5'-dichloroazobenzene, melting at 164° C., 5-chloro-4-methoxy-2-amino-2',4'-dichloroazobenzene, melting at 242° C. to 243° C., 4,5-dimethoxy-2-amino-2',4'-dichloroazobenzene, melting at 177° C. to 178° C.

(6) 16.2 parts of 2,4-dichloro-1-aminobenzene are stirred together with 30 parts by volume of hydrochloric acid of 22° Bé. and ice-cold water and 13.5 parts by volume of sodium nitrite solution of 40% strength are added. After diazotizing, the diazo solution runs at normal temperature into a solution of 18 parts of hydrochloride of 4-methyl-3-methoxy-1-aminobenzene in 250 parts of water. When the formation of dyestuff is finished, the whole is filtered by suction and the solid matter is washed out. 5-methyl-4-methoxy-2-amino-2',4'-dichloroazobenzene is obtained with a good yield, crystallizing from alcohol in the form of brown needles which melt at 196° C. to 197° C. The new compound may be diazotized and coupled.

By using instead of 2,4-dichloroaniline other diazotizing components, it is in some cases advisable to neutralize finally the excess of acid by means of sodium acetate.

(7) 16.2 parts of 2,5-dichloroaniline are diazotized as described in Example 1 and coupled with 19 parts of hydrochloride of 4-methyl-3-ethoxy-1-aminobenzene in 300 parts of water. When the coupling is finished, the whole is filtered by suction and the solid matter is washed out. 5-methyl-4-ethoxy-2-amino-2',5'-dichloroazobenzene forms, when redissolved from alcohol, brown crystals, melting at 164° C. The new compound may be diazotized and coupled.

In the following table a number of further ortho-amino-azo-compounds are disclosed which are obtainable in an analogous manner:

| | Diazo compound of | Coupling component | Ortho-aminoazo compound |
|---|---|---|---|
| (1) | 2, 5-dichloro-1-aminobenzene | 4-methyl-3-methoxy-1-aminobenzene | 5-methyl-4-methoxy-2-amino-2',5'-dichloro-azobenzene, melting at 147° C. |
| (2) | 4-nitro-2-chloro-1-aminobenzene | do | 5-methyl-4-methoxy-2-amino-2'-chloro-4'-nitro-azobenzene, melting at 212° C. |
| (3) | 2, 6-dichloro-4-nitro-1-aminobenzene | do | 5-methyl-4-methoxy-2-amino-2',6'-dichloro-4'-nitro-azobenzene, melting at 172° C. |
| (4) | 4-chloro-2-nitro-1-aminobenzene | do | 5-methyl-4-methoxy-2-amino-2'-nitro-4'-chloroazobenzene, melting at 198° C. |
| (5) | 4-methoxy-2-nitro-1-aminobenzene | do | 5-methyl-4-methoxy-2-amino-2'-nitro-4'-methoxyazobenzene, melting at 181° C. |
| (6) | 2, 4-dinitro-1-aminobenzene | do | 5-methyl-4-methoxy-2-amino-2',4'-dinitroazobenzene, melting at 221° C. |
| (7) | 4-methyl-2-nitro-1-aminobenzene | do | 5-methyl-4-methoxy-2-amino-2'-nitro-4'-methyl-azobenzene, melting at 171° C. |
| (8) | 4-nitro-2-chloro-1-aminobenzene | 4-methyl-3-ethoxy-1-aminobenzene | 5-methyl-4-ethoxy-2-amino-2'-chloro-4'-nitroazobenzene, melting at 190° C. |
| (9) | 5-methyl-4-chloro-2-sulfodimethylamide-1-aminobenzene. | 4-methyl-3-methoxy-1-aminobenzene | 5-methyl-4 methoxy-2-amino-2'-sulfo dimethylamide-4'-chloro-5'-methylazobenzene, melting at 247° C. |
| (10) | 2, 4-dichloro-1-aminobenzene | 4-chloro-3-methoxy-1-aminobenzene | 5-chloro-4-methoxy-2-amino-2',4'-dichloroazobenzene, melting at 242° C. to 243° C. |
| (11) | 4-nitro-2-chloro-1-aminobenzene | do | 5-chloro-4-methoxy-2-amino-2'-chloro-4'-nitroazobenzene, melting at 178° C. to 179° C. |
| (12) | 2, 4-dichloro-1-aminobenzene | 3, 4-dimethoxy-1-aminobenzene | 4-5-dimethoxy-2-amino-2',4'-dichloroazobenzene, melting at 177° C. to 178° C. |
| (13) | 4-nitro-2-chloro-1-aminobenzene | do | 4,5-dimethoxy-2-amino-2'-chloro-4'-nitroazobene, melting at 238° C. |
| (14) | 2, 6-dichloro-1-aminobenzene | 4-nitro-3-methoxy-1-aminobenzene | 5-nitro-4-methoxy-2-amino-2',6'-dichloro-azobenzene, melting at 214° C. to 215° C. |
| (15) | 4-chloro-2-nitro-1-aminobenzene | do | 5-nitro-4-methoxy-2-amino-2'-nitro-4'-chloroazobenzene, melting at 259° C. to 260° C. |
| (16) | 2-chloro-1-amino-benzene | do | 5-nitro-4-methoxy-2,amino-2'-chloro-azobenzene, melting at 239° C. to 240° C. |

We claim:
1. The compound of the formula:
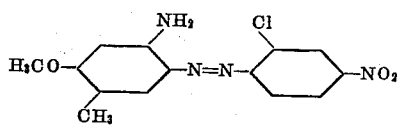
melting at 212° C.
2. The compound of the formula:
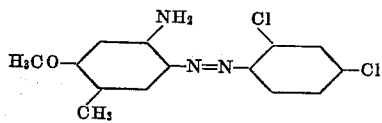
melting at 196° C. to 197° C.
3. The compound of the formula:
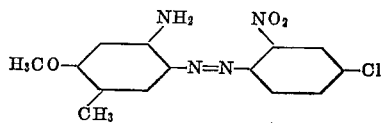
melting at 198° C.
4. The compounds of the general formula:
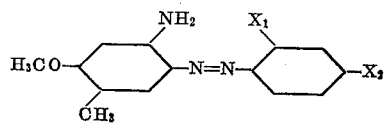
wherein $X_1$ and $X_2$ stand for members of the group consisting of nitro and chlorine.
ERWIN HOFFA.
HANS HEYNA.